United States Patent [19]

Deleens et al.

[11] 4,195,015

[45] Mar. 25, 1980

[54] HEAT AND AGING STABLE COPOLYETHERESTERAMIDES AND METHOD OF MANUFACTURING SAME

[75] Inventors: Gérard Deleens, Orsay; Bernard Guerin, Bures-sur-Yvette; Claude Poulain, Orsay, all of France

[73] Assignee: ATO Chimie, Courbevoie, France

[21] Appl. No.: 922,848

[22] Filed: Jul. 7, 1978

Related U.S. Application Data

[63] Continuation of Ser. No. 811,246, Jun. 29, 1977, abandoned.

[30] Foreign Application Priority Data

Jul. 30, 1976 [FR] France ................. 76 23399

[51] Int. Cl.² ................................................ C08K 5/18
[52] U.S. Cl. ........................ 260/45.75 C; 260/45.7 R; 260/45.7 QB
[58] Field of Search .................. 260/45.7 R, 45.75 C, 260/45.9 QB

[56] References Cited

U.S. PATENT DOCUMENTS

| 2,705,227 | 3/1955 | Stamatoff | 260/45.7 |
| 3,533,992 | 10/1970 | Sundholm | 260/45.9 QB |
| 3,636,135 | 1/1972 | Garforth | 260/75 N |
| 3,856,749 | 12/1974 | Hoeschele | 260/45.9 QB |

FOREIGN PATENT DOCUMENTS

2273021 12/1975 France.
932066 7/1963 United Kingdom.

*Primary Examiner*—V. P. Hoke
*Attorney, Agent, or Firm*—Bacon & Thomas

[57] ABSTRACT

Copolyetheresteramide based compositions which are stable with respect to the effects of heat, light and oxygen are disclosed. From about 0.05 to about 5% of 4-4'-bis-($\alpha$-$\alpha'$-dimethylbenzyl)-diphenylamide either alone or in combination with 0.01 to 2% of cuprous iodide and potassium iodide such that the ratio of CuI to KI is between 0.1 and 1.9 is added to the copolyetheresteramide to form a stable composition.

8 Claims, No Drawings

HEAT AND AGING STABLE COPOLYETHERESTERAMIDES AND METHOD OF MANUFACTURING SAME

This is a continuation of application Ser. No. 811,246, filed June 29, 1977, now abandoned.

The present invention concerns stable copolyetheresteramide compositions of high molecular weight which are capable of resisting the destructive effects of heat and inclemency.

French Pat. Nos. 2,273,021 and 75-31828 the disclosures of which are herein incorporated by reference describe the preparation of copolyetheresteramides which are useful for the fabrication of molded or extruded objects, films, tubes, fibers, filaments and molds.

These thermoplaste aliphatic copolyetheresteramides of high molecular weight are made up of an alternating sequences of polyamides and polyoxyalkyleneglycols which are connected to each other by ester groups. They are made by the polycondensation of a linear polyamide sequence of the 6,6-6,6-10,6-9,11 or 12-nylon type having carboxylic chains at its ends and an average molecular weight between about 300 and 15,000 with a polyoxyalkyleneglycol sequence having hydroxyl groups at its ends and having a molecular weight between about 100 and about 6000 as for example polyoxyethyleneglycol, polyoxypropyleneglycol and polyoxytetramethyleneglycol.

Even though these products have good mechanical properties, it has been observed that upon exposure to oxygen or heat they progressively degrade as a result of oxidation.

Likewise, the action of the oxygen together with the heat or the light causes degradation through oxidation of the copolyetheresteramide and at the same time the progressive loss of the mechanical qualities of the product.

The present invention overcomes the above inconveniences.

The invention makes possible the achievement of copolyetheresteramides which are stable to heat and to natural aging, while maintaining a high resistance to traction, to repeated flexure and to abrasion.

The invention comprises incorporation of a stabilizer of 4-4'-bis-($\alpha$-$\alpha'$-dimethylbenzyl)-diphenylamine into the copolyetheresteramide. Although, this stabilizer is sufficiently effective when added alone, it has been found to be of greater advantage to use it in conjunction with another stabilizer which comprises a mixture of cuprous iodide and potassium iodide.

The stabilizers may be incorporated into the copolyetheresteramide by mixing. Mixing is performed while adding 4-4'-bis-($\alpha$-$\alpha'$-dimethylbenzyl)-diphenylamine copolyetheresteramide obtained in the form of granules or powder. The cuprous iodide is likewise added in powdered form.

It has been found preferable to add the potassium iodide in the form of a highly concentrated solution which is close to saturation.

One can equally introduce the 4-4'-bis-($\alpha$-$\alpha'$-dimethylbenzyl)-diphenylamine into the polycondensation reactor at the same time as the starting materials. At the proportions necessary for effective stabilization, the 4-4'-bis-($\alpha$-$\alpha'$-dimethylbenzyl)-diphenylamine hardly affects the rate of the reaction. It has been found preferable to introduce the stabilizer at the beginning of the polycondensation process. Addition at this stage has the advantage of avoiding the degrading oxidation of the polyamide and polyester sequences as well as the copolyetheresteramide in the course of its formation. Furthermore, the presence of 4-4'-bis-($\alpha$-$\alpha'$-dimethylbenzyl)-diphenylamine makes it possible to obtain a product having a more constant viscosity by limiting the evolution of the polymeric chain during the consecutive stages of the reaction.

The cuprous and potassium iodides may equally be introduced at the beginning or in the course of the polymerization. However since these materials substantially slow up the rate of reaction it is preferable to introduce them into the copolyetheresteramide granules later on but before the drying step as well as before the transformation operations of the polycondensate: compaction, extrusion and molding.

The 4-4'-bis-($\alpha$-$\alpha'$-dimethylbenzyl)-diphenylamine is to be introduced in proportions of about 0.05% to about 5%, preferably between about 0.2 and about 2%, by weight of the copolyetheresteramide.

The cuprous-iodide-potassium iodide stabilizer constitutes by weight between about 0.01 and 2%, preferably between about 0.1 and 0.5% of the mixture. If too great a proportion of stabilizer is used the final product will be strongly tinted.

The ratio by weight of cuprous iodide to potassium iodide can vary between 0.1:1 and 1.9:1; the preferred ratio being between 0.4:1 and 1:1.

The control and identification tests performed on the products obtained were:

(1) The Vicat point in °C., expressed according to the standard of ASTM D 1525 65T.
(2) The intrinsic viscosity was tested in metacresol at 25° C. (initial concentration of 0.5 grams per 100 ml).
(3) Elongation under traction is measured according to the ASTM D 638 67T standard and the modulus of torsion is measured in accordance with the standard set by ASTM D 1043 61T according to the method of CLASH and BERG.

The following examples are given by way of example only and are not intended to be limiting.

EXAMPLE 1

100 grams of dicarboxylic-6-polyamide in powdered form having an average molecular weight of 1300 made by polymerization of caprolactam in the presence of adipic acid are added to a 6 liters capacity stainless steel reactor. The reactor is fitted with a variable speed agitation device. Subsequently, 350 g of polyoxytetramethyleneglycol having a molecular weight of 650 and 1.3 g of tetraisopropylorthotitanate are added to the reactor.

The reaction mixture is stirred under moderate agitation and under a strong vacuum (below 0.5 torr) at a temperature of 200° C. The reaction mass is thus entirely melted and the rate of agitation is increased so as to obtain a good dispersion of the mixture which comprises two phases: polyether and polyamide, which are non-miscible at the beginning of the reaction. Melting of the mixture continues until the temperature reaches 260° C. The reaction continues at this temperature of about 4 to 5 hours.

The polyetheresteramide thus obtained has an inherent viscosity of 1.50 at a concentration of 0.5 g/dl in metacresol at 25° C., and a shore D hardness of about 55.

After crushing into granules and stoving under vacuum at 80° C., the polyetheresteramide obtained is mixed with 1% by weight of powdered 4-4'-bis-($\alpha$-$\alpha$'-dimethylbenzyl)-diphenylamine by means of a dry mixer. The mixture of granulated polymers and powdered stabilizer is treated at 230° C. in a BRABENDER single screw extruder whose rotational speed is about 80 rev/min.

The product which exits from the outlet of the extruder in the form of stems is cut into small cylinders which are dried at 80° C. The product is then injection-molded in an ARBURG piston screw press in which the temperature is maintained at approximately 228° C.

Test samples in the form of dumb-bells having a thickness of 2 mm and a width of 4.4 mm which had been maintained for 15 days at 23° C. under a relative humidity of 50% exhibited the following mechanical characteristics at ambient temperature:

Tensile strength or Elongation to rupture=370% at 380 kg/cm$^2$

Apparent modulus of torsion=630 kg/cm$^2$ at 23° C.

Vicat point=170° C.

When heated in air for 3 weeks at 150° C. these samples maintain 80% of their tensile strength (305 kg/cm$^2$).

By way of comparison, test samples of the same polyetheresteramide which do not contain 4-4'-bis-($\alpha$-$\alpha$'-dimethylbenzyl)-diphenylamine become very fragile after exposure to air at 150° C.

EXAMPLE 2

In an embodiment analogous to Example 1, except that 4-4'-bis-($\alpha$-$\alpha$'-dimethylbenzyl)-diphenylamine is present in an amount of 1% by weight of the total composition in the polycondensation reactor of the same time as the starting materials.

Even though the stabilizer had been present from the beginning of the reaction onward, no change in the rate of reaction was observed.

The mechanical properties of the injection-molded test pieces made out the product were virtually identical to those achieved in Example 1.

Likewise, after being heated for three weeks in air at a temperature of 150° C., the product of this example maintained 80% of its original tensile strength.

EXAMPLE 3

Following the steps analogous to those of Example 1, 700 g of dicarboxylic polyamide having a molecular weight of 2000 obtained by polycondensation of 11-aminoundecanoic acid in the presence of adipic acid, 350 g of polyoxyethyleneglycol having an average molecular weight of 1000 and 1.5 g of tetrabutylorthotitanate are reacted for 6 to 7 hours at 260° C. under a high vacuum so as to obtain a polyetheresteramide having an inherent viscosity equal to 1.40 at a concentration of 0.5 g/dl in metacresol at 25° C.

The 4-4'-bis-($\alpha$-$\alpha$'-dimethylbenzyl)-diphenylamine stabilizer is incorporated by the same dry embedding extrusion process of Example 1.

After exposure of the this stabilized polyetheresteramide to a low humidity heat of 150° C. for 170 hours it maintained 90% of its initial tensile strength.

In comparison when the same polyetheresteramide was not stabilized it suffered such extensive degradation that the same tensile strength was unobtainable after only 10 hours of exposure.

EXAMPLE 4

700 g of dicarboxylic-6-polyamide having an average molecular weight of 2000, 350 g of polyoxytetrabutyleneglycol having an average molecular weight of 1000, 1.3 g of tetraisopropylorthotitanate and 5.3 g of 4-4'-bis-($\alpha$-$\alpha$'-dimethylbenzyl)-diphenylamine were introduced into a stainless stell reactor having a variable speed agitator.

The reaction mixture is heated under vacuum and is mildly stirred up to a temperature of 200° C., until the mass melts. The stirring speed is then increased to obtain a better dispersion of the existing phases until a temperature of 260° C.

The reaction is continued for 4 to 5 hours so as to obtain a polyetheresteramide having an inherent viscosity of 1.5. The shore D hardness of the product obtained is equal to 55.

The polyetheresteramide is then fed to a planetary mixer together with 0.05% by weight of cuprous iodide having a very fine granulometry (50 to 10$\mu$) and 0.1% of potassium iodide which had first been dissolved in the least amount of water possible. The mixture, which is performed in a homogeneous fashion is subsequently kept in a stove at 80° C. and then extruded at 230° C. with a single screw BRABENDER apparatus rotating at 80 rev/min.

The product exiting from the outlet of the extruder in the form of stems is cooled in a water bath and cut into small cylinders. The cylinders are dried under a vacuum at 80° C. and fed into an ARBURG piston-screw injection press where they are transformed at a temperature of 220° C. into dumb-bell shaped test pieces having a thickness of 2 mm and a width of 4.4 mm which are suitable for the standard mechanical tests.

The mechanical characteristics, determined at ambient temperature, for test pieces maintained at 23° C. for 15 days under a 50% relative humidity were as follows:

Elongation to rupture=380% at 330 kg/cm$^2$

Apparent modulus of torsion at 20° C.=630 kg/cm$^2$

When the stabilized test pieces of polyetheresteramide of this example were heated in air for 10 weeks at 150° C., they retained 80% of their tensile strength.

After exposure to bad weather conditions for 12 months, the test pieces still retained good mechanical properties.

By way of comparison, test pieces made out of the same polyetheresteramide containing no stabilizing agent become very fragile at exposure to the atmosphere for day at a temperature of 150° C.

Furthermore, after one week of exposure to inclement conditions the condition of their surface is significantly changed.

EXAMPLE 5

As in Example 3, polyetheresteramide is prepared by starting with dicarboxylic-6-polyamide and polytetramethyleneglycol; 4-4'-bis-($\alpha$-$\alpha$'-dimeythylbenzyl)-diphenylamine, cuprous iodide and potassium iodide are added to the reactor together with the other reactants.

By comparison with Example 3, the time necessary to obtain a polyetheresteramide having an inherent viscosity of 1.50 by polycondensation is increased by two hours.

The mechanical characteristics as well as the natural aging characteristics by exposure to the atmosphere and to inclement conditions at 150° C. are analogous to those described in Example 3.

The specification presents a detailed disclosure of preferred proportions, particular compounds and preferred methods of making the inventive compositions, yet, it is to be understood that the invention is not limited to the specific compositions and methods disclosed but comprises instead all modifications and substitutions of equivalents falling within the scope of the invention as defined by the claims.

We claim:

1. A thermoplastic aliphatic copolyetheresteramide based composition of high molecular weight stabilized to light, heat and oxidation comprising:

a copolyetheresteramide and 4-4'-bis-($\alpha$-$\alpha$'-dimethylbenzyl)-diphenylamine in an amount of between about 0.05 and about 5% by weight of the copolyetheresteramide and between about 0.01 and about 2% by weight of a mixture of cuprous iodide and potassium iodide, the ratio by weight of said cuprous iodide to said potassium iodide being equal to between 0.1:1 and 1.9:1.

2. The composition of claim 1, wherein said copolyetheresteramide comprises alternating sequences of aliphatic polyamides having molecular weights of between about 300 and about 15,000 and polyoxyalkylene glycols having a molecular weight of between about 100 and about 6000 which are linked to one another by esters.

3. The compositions of claim 1, wherein said composition further comprises: between about 0.01 and about 2% by weight of a mixture of cuprous iodide and potassium iodide, the ratio by weight of said cuprous iodide to said potassium iodide being equal to between 0.1:1 and 1.9:1.

4. The composition of claim 1, wherein the amount by weight of 4,4'-bis-($\alpha$-$\alpha$'-dimethylbenzyl)-diphenylamine is betwen about 0.2% and about 2% by weight of the copolyetheresteramide and wherein the amount of said iodide mixture present is between about 0.1 and 0.5% and wherein the ratio by weight of cuprous iodide to potassium iodide is between about 0.4:1 and 1:1.

5. The composition of claim 1, wherein the amount by weight of 4,4'-bis-($\alpha$-$\alpha$'-dimethylbenzyl)-diphenylamine is between about 0.2% and about 2% by weight of the copolyetheresteramide.

6. The composition of claim 1, wherein the amount by weight of said iodide mixture present is between about 0.01 and 0.5% and wherein the ratio by weight of cuprous iodide to potassium iodide is between about 0.4:1 and 1:1.

7. The composition of claim 1 wherein the copolyetheresteramide was prepared in the presence of a tetraisopropylorthotitanate.

8. The composition of claim 1 in the form of molded or extruded objects, films, tubes, fibers, filaments and molds.

* * * * *